US006953274B2

(12) United States Patent
Rice

(10) Patent No.: US 6,953,274 B2
(45) Date of Patent: Oct. 11, 2005

(54) AFS FOR LED HEADLAMP

(75) Inventor: Lawrence M. Rice, Anderson, IN (US)

(73) Assignee: Guide Corporation, Pendleton, IN (US)

( * ) Notice: Subject to any disclaimer, the term of this patent is extended or adjusted under 35 U.S.C. 154(b) by 17 days.

(21) Appl. No.: 10/448,622

(22) Filed: May 30, 2003

(65) Prior Publication Data

US 2004/0240217 A1 Dec. 2, 2004

(51) Int. Cl.[7] .................................................. B60Q 1/06

(52) U.S. Cl. ........................ 362/526; 362/271; 362/286; 362/545; 362/800

(58) Field of Search ......................... 362/526, 507–508, 362/286–287, 372, 545, 232, 271–272

(56) References Cited

U.S. PATENT DOCUMENTS

| | | | | |
|---|---|---|---|---|
| 3,985,424 A | | 10/1976 | Steinacher | |
| 4,868,718 A | | 9/1989 | Davenport et al. | |
| 4,949,227 A | | 8/1990 | Finch et al. | |
| 5,113,321 A | * | 5/1992 | Suzuki | 362/538 |
| 5,222,793 A | | 6/1993 | Davenport et al. | |
| RE34,318 E | | 7/1993 | Davenport et al. | |
| 5,488,696 A | | 1/1996 | Brosnan | |
| 5,676,445 A | | 10/1997 | Kato | |
| 5,752,766 A | * | 5/1998 | Bailey et al. | 362/250 |
| 5,931,576 A | | 8/1999 | Kreysar et al. | |
| 6,144,791 A | | 11/2000 | Wach et al. | |
| 6,152,588 A | | 11/2000 | Scifres | |
| 6,168,302 B1 | | 1/2001 | Hulse | |
| 6,186,650 B1 | | 2/2001 | Hulse et al. | |
| 6,390,643 B1 | * | 5/2002 | Knight | 362/250 |
| 6,585,395 B2 | * | 7/2003 | Luk | 362/250 |

* cited by examiner

*Primary Examiner*—Ali Alavi
(74) *Attorney, Agent, or Firm*—Ice Miller

(57) ABSTRACT

The subject invention comprises an adaptive front lighting system ("AFS") utilizing at least one light emitting diode ("LED") as a light source and a means for moving the LED to achieve AFS functionality. An exemplary embodiment of the subject invention comprises a plurality of LEDs positioned and located on a LED carrier. The LED carrier is mechanically connected to at least one actuator that causes the LED carrier and LEDs to move. A controller is used to cause the actuator to move the LEDs. In this manner, this exemplary embodiment adjusts the light beam and creates the desired light beam pattern. Other exemplary embodiments of the subject invention pivotally connect the LEDs to the lens and to each other and utilize the actuator and controller to adjust the light beam. Another exemplary embodiment positions the LEDs in a spherical surface and connects them to the actuator by an extension in order to adjust the light beam.

19 Claims, 19 Drawing Sheets

AFS FOR LED HEADLAMP

BACKGROUND OF THE INVENTION

Automotive forward lighting systems designs have been modified over the years to increase the illumination of the road in order to increase driving safety. As safety has become a paramount concern of automotive lighting designers, designers have sought ways to make the automotive forward lighting beam more adaptive to the changing driving conditions encountered by vehicles on the road. In response to these safety concerns, it has become desirable to adjust an automotive forward lighting beam relative to the vehicle. For example, when a vehicle is driving around a corner, it may be desirable for the vehicle's forward lighting beam to be adjusted such that the emitted light better illuminates the roadway around the corner. Additionally, adverse weather conditions, the presence of oncoming traffic, the driving environment (i.e., city driving versus rural driving), or an increase or a decrease in a vehicle's speed may also result in circumstances where an adjustment of the vehicle's forward lighting beam may become desirable. In these situations, the forward lighting beam pattern is adjusted to increase the illumination of the road and/or the visibility of the driver(s) in order to increase safety.

Automotive headlamps that can be adjusted in this manner are generally known in the industry as adaptive front lighting systems ("AFS"). AFS for conventional or projector headlamps generally adjust the emitted light beam pattern by moving the entire lamp assembly. Alternatively, such systems may accomplish AFS functionality by moving the lamp reflector or the lens. While these methods accomplish AFS functionality, they cause other problems with the lighting system. For example, laterally moving the entire lamp assembly may distort the assemblies beam pattern from its original shape and decrease the visibility of the driver. This can cause the emitting light to become non-compliant with applicable governmental regulations on automotive forward lighting systems. Additionally, when moving the entire lamp assembly, the reflector or the lens requires a large amount of clearance space to keep the headlamp from swinging into other parts. Such movement can eventually result in the complete failure of the lamp assembly. Moreover, when adjustments in the light beams' pattern are necessary, moving the large mass of the entire lamp assembly may require a longer than desired response time.

Most conventional automotive forward lighting systems require a large amount of mass concentration at the front of the vehicle. A typical automotive forward lighting system comprises a housing with a reflector, at least one filament bulb, a plurality of electrical wires and a lens. This construction is rather large in size and takes up considerable amount of space when housed in a vehicle. Further, the size of a typical lamp assembly and the required parts of a front lighting system result in a large mass concentration located at the front of the vehicle. In the event of a vehicular accident, a large mass concentration at the front of the vehicle is undesirable because it can result in increased damage and increased injuries. This is especially problematic in the event an automobile collides with a pedestrian. AFS for conventional and projector headlamps increase this problem because they require additional parts to move the beam. Thus, AFS headlamps increase the mass concentration located at the front of the vehicle.

Accordingly, it is desirable to have an automotive forward lighting assembly that would allow for adjustment of the forward lighting beam without requiring movement of the entire lamp assembly, the lens, or reflector to accomplish AFS functionality. It is also desirable to develop a forward automotive lighting system that can further reduce the size and amount of mass of a headlamp located at the front of the vehicle in order to increase pedestrian and automobile safety. In particular, it is desirable to use light emitting diodes ("LEDs") as the light source of the forward automotive lighting system and to use a means for moving only the LEDs to accomplish AFS functionality. As used herein, the term "LED" refers to a light emitting diode and its associated mounting, if any.

BRIEF SUMMARY OF THE INVENTION

The subject invention comprises an automotive adaptive front lighting system comprising at least one LED, at least one lens, and a means for moving the at least one LED. One embodiment of the subject invention comprises a plurality of LEDs joined together by a LED carrier and a plurality of condensing lenses each positioned in front of one of the LEDs. In this embodiment, at least one actuator is mechanically connected to the LED carrier. A controller communicates to the actuator the manner the light beam needs to be adjusted and the actuator moves the LED carrier and LEDs small distances to create the desired adjustment of the light beam.

In another embodiment of the subject invention, a plurality of LEDs are connected to one another by a linking means and are each pivotally connected to a separate condensing lens by a plurality of arms. In this embodiment, the at least one actuator can be mechanically connected to the linking mechanism and operably connected to the controller to cause movement of the LEDs and the desired adjustment of the light beam.

In a third embodiment, a plurality of LEDs are each individually connected to a plurality of harnesses and housed in a lamp housing. The plurality of harnesses each connect each of the plurality of the LEDs to an individual condensing lens and are pivotally connected to one another by a linking mechanism. At least one actuator is mechanically connected to the linking mechanism and causes both the LED and condensing lens to move in a desired direction in order to adjust the light beam in the desired manner.

In a fourth embodiment, a plurality of LEDs are positioned on one or more spherical surfaces and are attached to a stud so that when the stud is moved, the LED will slide across the spherical surface in the desired direction. At least one actuator is mechanically connected to the stud and moves the stud in the desired direction. As the stud moves, each LED slides in the corresponding direction to adjust the light beam.

A fifth embodiment of the subject invention comprises a plurality of LEDs attached to a LED carrier positioned in a lamp housing. The LEDs are positioned and located in the lamp housing so that each LED faces an individual reflector. At least one actuator is mechanically connected to the LED carrier in a manner that allows the light beam to be adjusted. When the actuator is operated, the plurality of LEDs are moved in the desired direction and the light beam is adjusted in the desired manner.

DETAILED DESCRIPTION OF THE INVENTION

Figure 1:
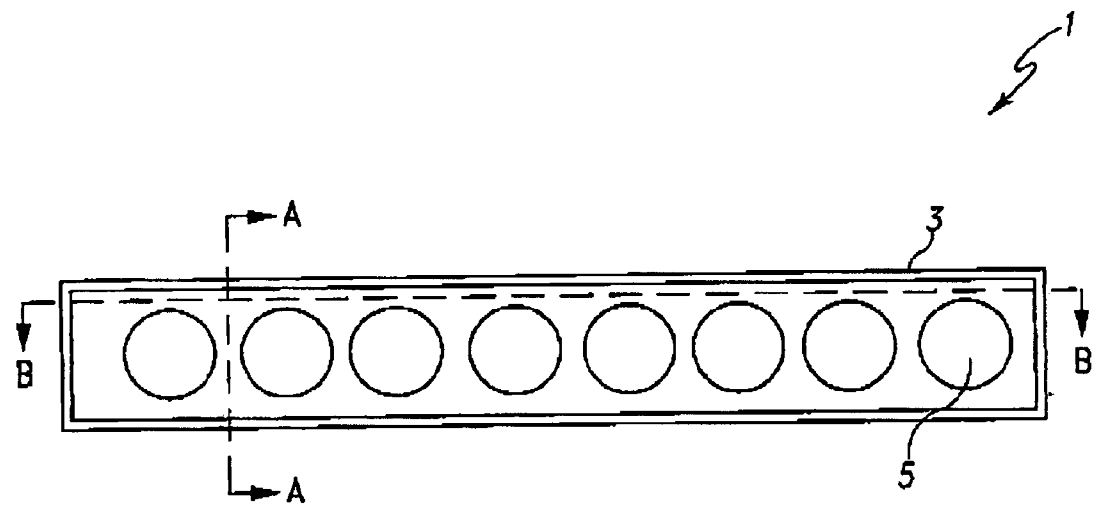
FIG. 1 is a front view of an exemplary embodiment of the subject invention.

The subject invention comprises an AFS LED headlamp assembly. FIG. 1 shows a front view of one exemplary embodiment of the subject invention. As shown in FIG. 1, the exemplary embodiment of the subject invention comprises an AFS LED headlamp assembly 1. AFS LED headlamp assembly 1 comprises a plurality of condensing lenses 5 and a lamp housing 3. In this embodiment, all the condensing lenses are attached and/or fixed to lamp housing 3 by means well known in the art. For example, the lenses can be attached by snapping them into the lamp housing or by utilizing an adhesive to fix them to the lamp housing. It will be appreciated by one skilled in the art that lamp housing 3 can be made out of a variety of materials and a manufacturing processes known to those skilled in the art. Further, it will be appreciated by one skilled in the art that the subject invention can be created in the desired shape to meet vehicular design requirements and that any type of lens can be utilized in the subject invention.

Figure 2:
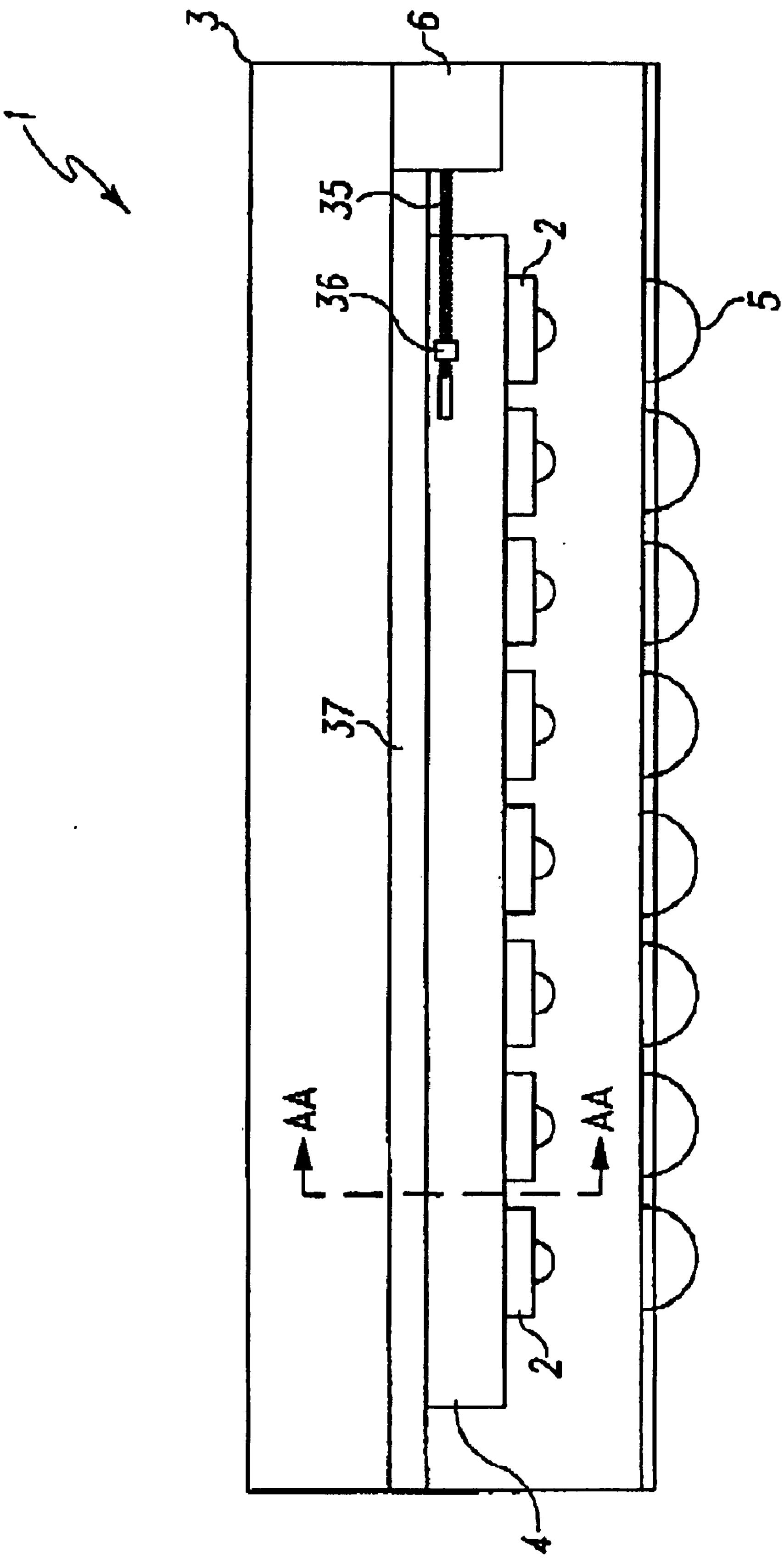
FIG. 2 shows a cross-sectional view of the exemplary embodiment of FIG. 1 along line B—B.
Figure 3:
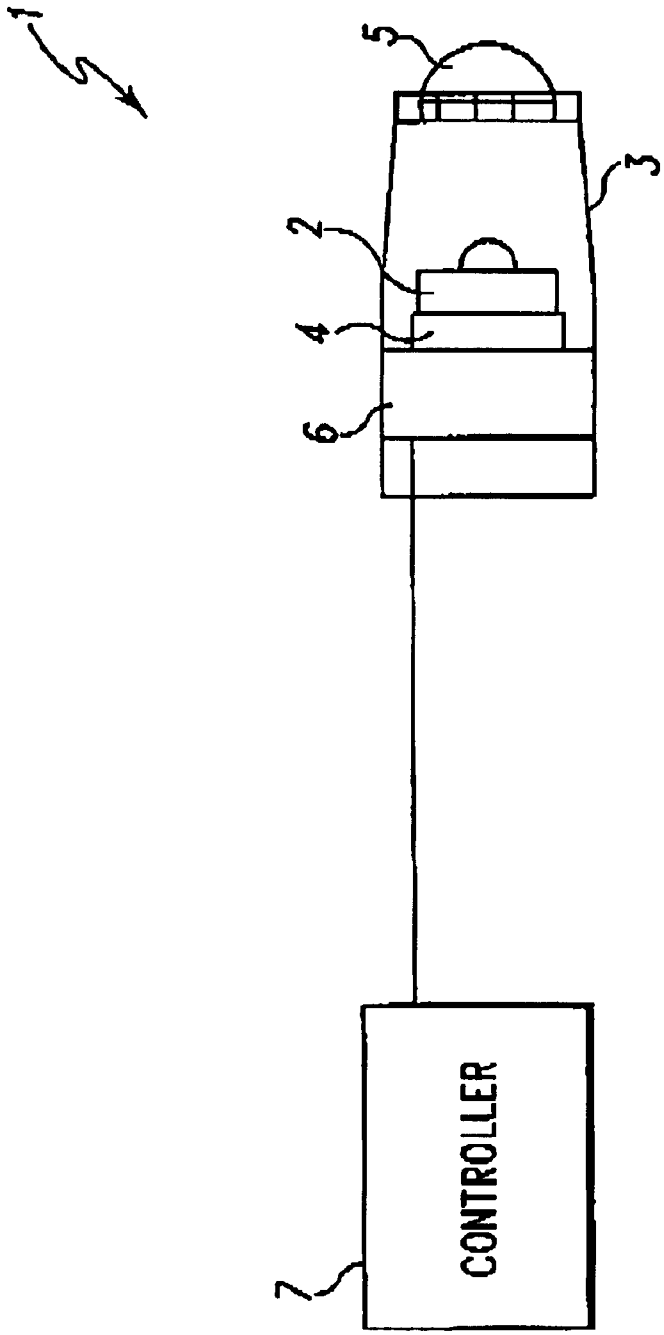
FIG. 3 shows a cross-sectional view of the exemplary embodiment of FIG. 1 along line A—A.

FIG. 2 shows a cross-sectional view of AFS LED lamp assembly 1 along line B—B of FIG. 1. As shown in FIG. 2, AFS LED lamp assembly 1 further comprises a plurality of LEDs 2 and an actuator. In this embodiment, the actuator comprises a stepper motor 6. FIG. 3 shows a cross-sectional view of AFS LED lamp assembly along line A—A of FIG. 1. As shown in FIGS. 2 and 3, plurality of LEDs 2 are mounted to a LED carrier 4. LED carrier 4, among other things, serves to act as a heat sink in the present embodiment. Accordingly, it will be appreciated by one skilled in the art that LED carrier 4 can be constructed using a variety of heat sinking materials. Plurality of LEDs 2 and LED carrier 4 are placed into AFS LED lamp assembly 1 so that each of the plurality of LEDs are aligned with one of the plurality of condensing lens 5 to create the desired light beam pattern. It will be appreciated by one skilled in the art that the plurality of LEDs can be mounted to LED carrier in any number of ways known to those of ordinary skill in the art, including but not limited to, using screws or an adhesive to mount the LEDs to the LED carrier. While FIG. 2 shows the exemplary embodiment utilizing eight LEDs and eight condensing lenses, it will be appreciated by one skilled in the art that any number of LEDs and condensing lenses can be utilized in the subject-invention.

Figure 2A:
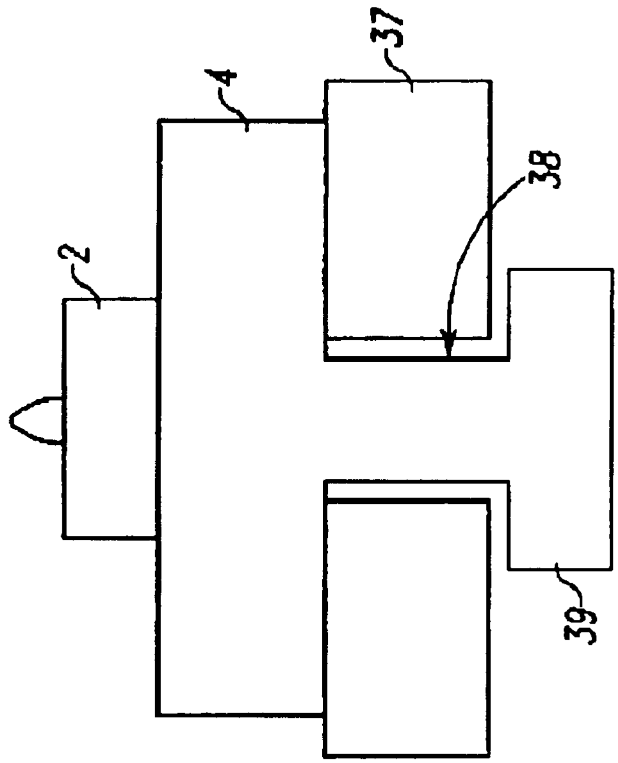
FIG. 2*a* shows a cross-sectional view of the exemplary embodiment of the subject invention along line AA—AA of FIG. 2.

Referring to FIG. 2, LED carrier 4 has a threaded block 36 mounted to it. Threaded block 36 receives a lead screw 35. Lead screw 35 is mechanically attached to stepper motor 6 so that the lead screw can be turned by the stepper motor. LED carrier 4 is mounted to a track 37 so that it can slide back and forth in the horizontal direction. FIG. 2*a* is a cross-sectional view of LED carrier 4 and track 37 along line AA—AA of FIG. 2. As shown in FIG. 2*a*, track 37 has a slot 38 that accepts and holds a T-block 39 located on the backside of LED carrier 4. T-block 39 allows LED carrier 4 to slide back and forth along track 37 and prevents the LED carrier from coming off the track. Referring back to FIG. 2, stepper motor 6 turns lead screw 35 which causes LED carrier 4 and attached LEDs 2 to move in the desired horizontal direction without moving plurality of condensing lenses 5 or AFS LED lamp assembly 1, which both remain stationary.

It will be appreciated by one skilled in the art that the actuator is not limited to the stepper motor but can comprise any number of mechanisms. For example, the actuator can comprise a cross-slide and rack and pinion system to move the plurality of LEDs and lamp carrier up and down, forwards and backwards or side to side. Alternatively, the actuator can comprise a stepper motor or a solenoid that turns a plurality of gears that causes the plurality of LEDs and the lamp carrier to move in a desired direction. It will be appreciated by one skilled in the art that lamp carrier 4 is not required and that alternatively each of the plurality of LEDs 2 can be mechanically connected directly to the actuator. Further, it will be appreciated by one skilled in the art that each LED could be mounted to its own lamp carrier and/or actuator, so that each LED could be moved independently of the other LEDs. While FIGS. 2 and 3 shows this exemplary embodiment utilizing one actuator, it will be appreciated by one skilled in the art that any number of actuators can be utilized in the subject invention to move the plurality of LEDs in any number of directions.

Figure 4:
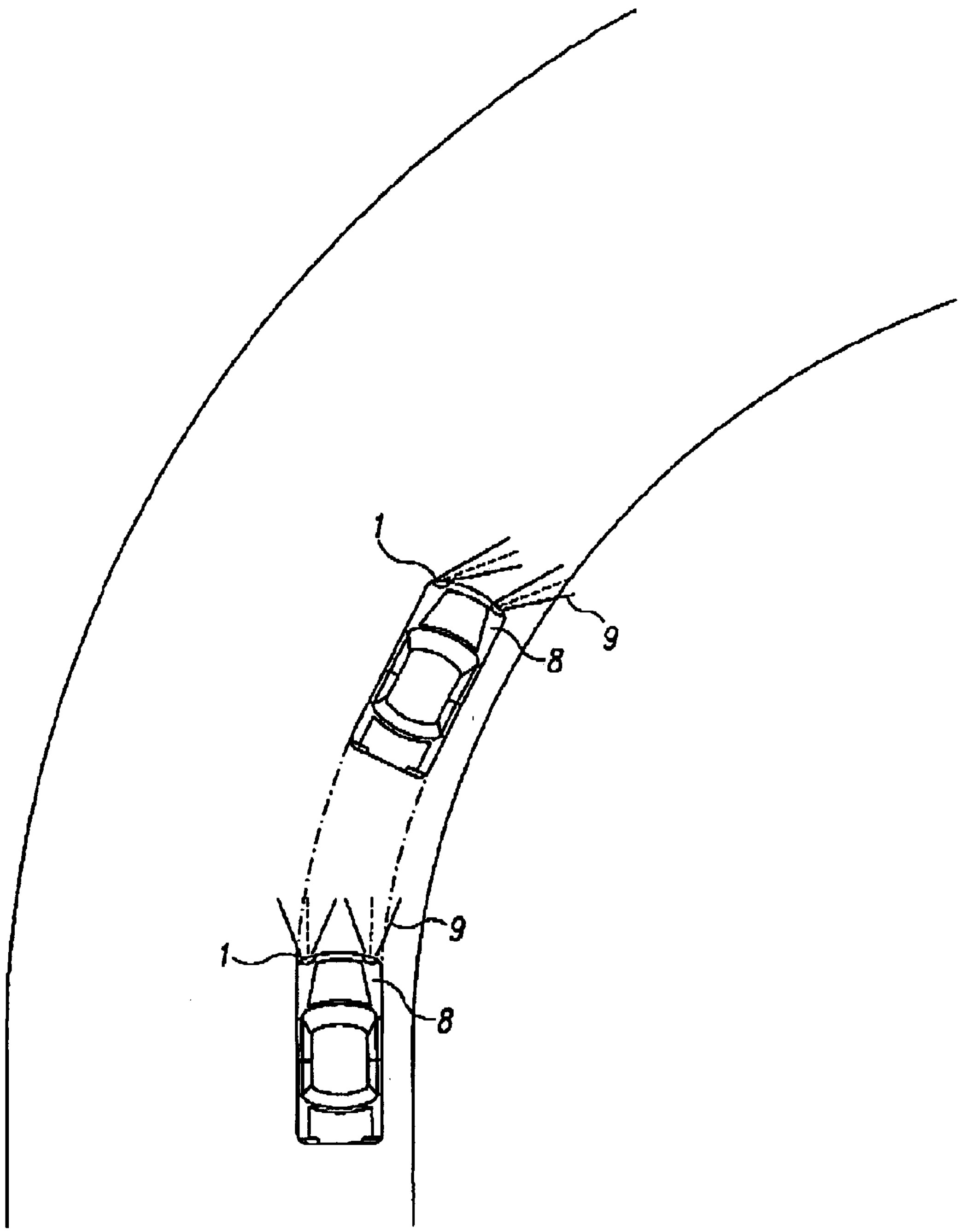
FIG. 4 is a top view of a vehicle utilizing the exemplary embodiment of FIG. 1.

As shown in FIG. 3, stepper motor 6 is operably connected to a controller 7. In order to adjust the corresponding light beam, controller 7 communicates to stepper motor 6 which direction to move LEDs 2. For example, FIG. 4 shows a vehicle 8 turning right along a curve in the road that utilizes AFS LED lamp assembly 1. As shown in FIG. 4, as vehicle 8 turns to the right, controller 7 will cause stepper motor 6 to move the light beam 9 to the right. It will be appreciated by one skilled in the art that the controller can comprise a variety of mechanisms, including, but not limited to, a microprocessor that receives input from various sensors or a circuit of electrical components that measures the speed of the vehicle, the direction of movement of the vehicle, and/or any oncoming traffic in order to cause the stepper motor to properly adjust the light beam. Further, it will be appreciated by one skilled in the art that the at least one stepper motor can be operably connected to the controller in any number of ways known to those skilled in the art. Moreover, it will be appreciated by one skilled in the art that the light beam can be adjusted in this manner to accomplish all AFS functionality. For example, the LEDs can be moved forward and backward to increase or decrease the area illuminated by the AFS lamp assembly or the LEDs can be moved to the right or left and/or up and down to position the light beam in the desired location.

Figure 5:
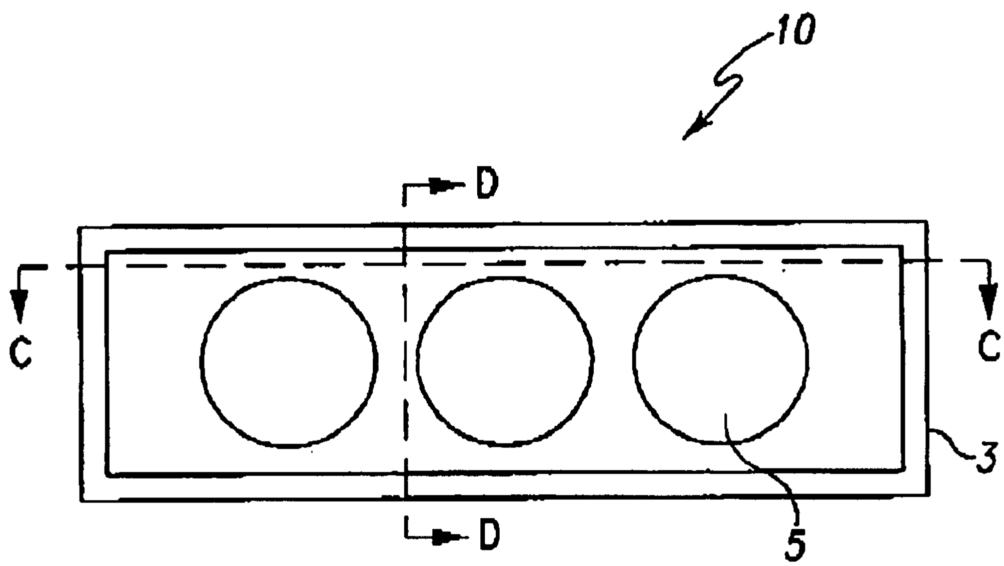
FIG. 5 shows a front view of another exemplary embodiment of the subject invention.
Figure 6:
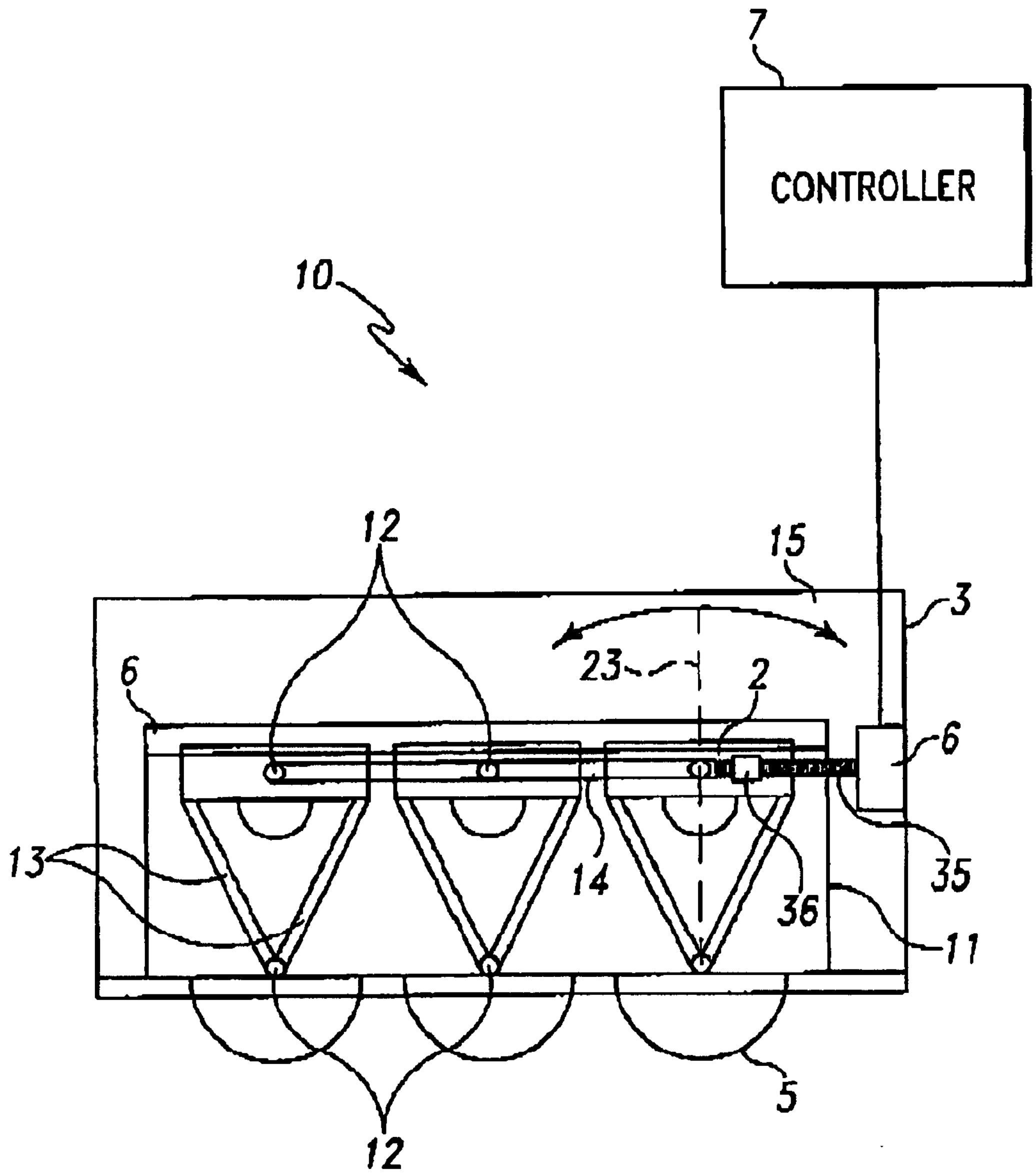
FIG. 6 shows a cross-sectional view of the exemplary embodiment of the subject invention along line C—C of FIG. 5.

FIG. 5 shows a front view of another embodiment of the subject invention. As shown in FIG. 5, this exemplary embodiment comprises an AFS LED lamp assembly 10 having plurality of condensing lens 5 and lamp housing 3. FIG. 6 shows a cross-sectional view along line C—C of FIG. 5. As shown in FIG. 6, AFS LED lamp assembly 10 further comprises plurality of LEDs 2 and a secondary housing 11. LEDs 2 are pivotally connected to each of condensing lenses 5 by plurality of arms 13 so that each of the LEDs are aligned with one of the plurality of the condensing lenses to create the desired light beam pattern. One end of each of plurality of arms 13 is anchored to the LED and the other end of each of the arms is pivotally connected to each of the condensing lenses by a plurality of axles 12. Further, plurality of LEDs are each connected to one another by a connecting strip 14. Connecting strip 14 is pivotally connected to each of the plurality of LEDs 2 by a plurality of axles 12 that extend through the base of each of the plurality of LEDs perpendicular to the connecting strip. While FIG. 6 shows this exemplary embodiment with connecting strip 14 located on top of each of the plurality of LEDs 2, it will be appreciated by one skilled in the art that the connecting strip can be located on the bottom or the back of each of the LEDs or on the plurality of arms in order to link the LEDs together. Moreover, it will be appreciated by one skilled in the art that connecting strip 14 is not necessary and that each LED 2 can be connected to its own actuator so that each LED would be moved independently from each other.

Figure 7:
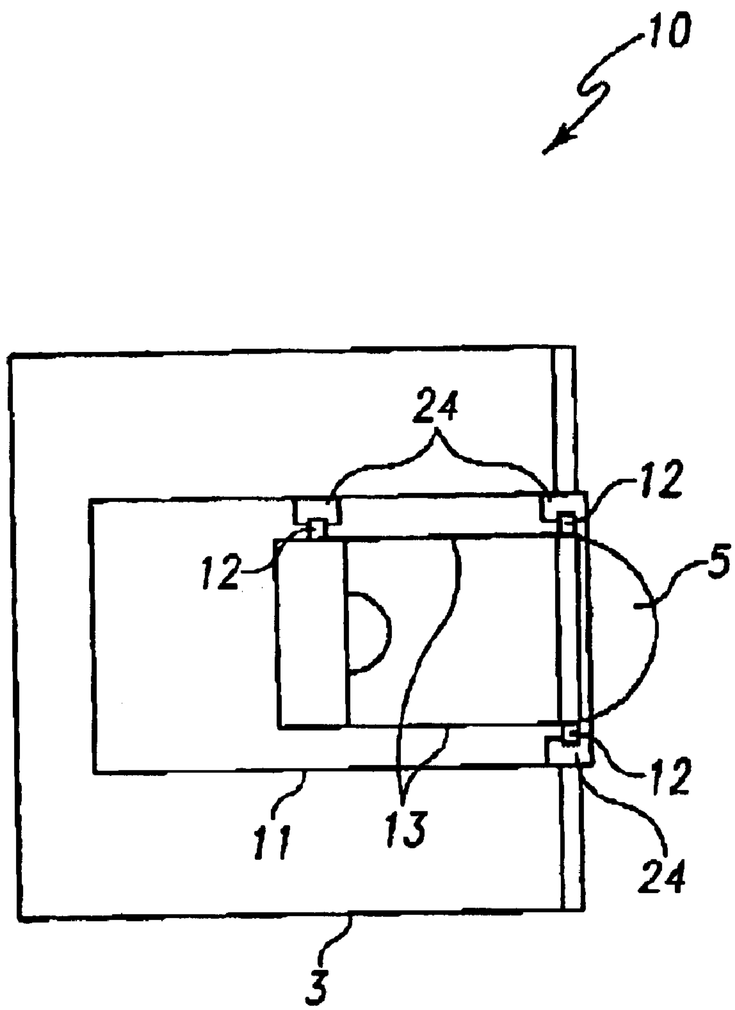
FIG. 7 shows a cross-sectional view of the exemplary embodiment of FIG. 5 along line D—D.

FIG. 7 shows a cross-sectional view of AFS LED lamp assembly 10 along line D—D of FIG. 5. As shown in FIG. 7, AFS LED lamp assembly 10 further comprises secondary housing 11. Secondary housing 11 has a plurality of pivot points 24 that accept and hold plurality of axles 12 located on lenses 5 and LEDs 2. While the present embodiment utilizes secondary housing 11 to pivotally mount the LEDs in AFS LED lamp housing 10, it will be appreciated by one skilled in the art that the LEDs could be pivotally mounted in the AFS LED lamp assembly in a variety of ways known to those skilled in the art. It will also be appreciated by one skilled in the art that the LEDs should be pivotally mounted in a manner to prevent outside elements from entering the AFS LED lamp assembly.

Referring back to FIG. 6, stepper motor 6 is mechanically connected to connecting strip 14 by a threaded block 36 and lead screw 35. Stepper motor 6 causes LEDs 2 to pivot around a lens plane 23 in a horizontal arc as depicted by directional arrows 15. As LEDs 2 pivot around lens plane 23 each of the plurality of LEDs will pivot slightly about its axle 12 that pivotally connects each of the plurality of LEDs to connecting strip 14. As described above in association with FIGS. 3 and 4, controller 7 is operably connected to stepper motor 6 in order to cause the stepper motor to move LEDs 2 in the desired direction without moving the condensing lenses 5 or lamp housing 3, which both remain stationary. In this manner, AFS LED lamp assembly 10 is able to adjust the light beam in the desired manner by moving the LEDs 2.

Figure 8:
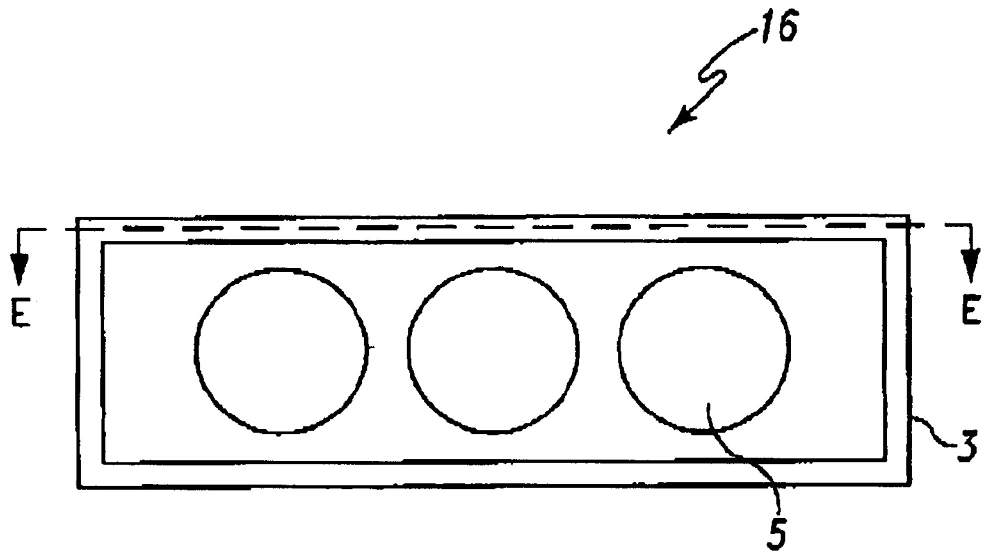
FIG. 8 shows a front view of another exemplary embodiment of the subject invention.
Figure 9:
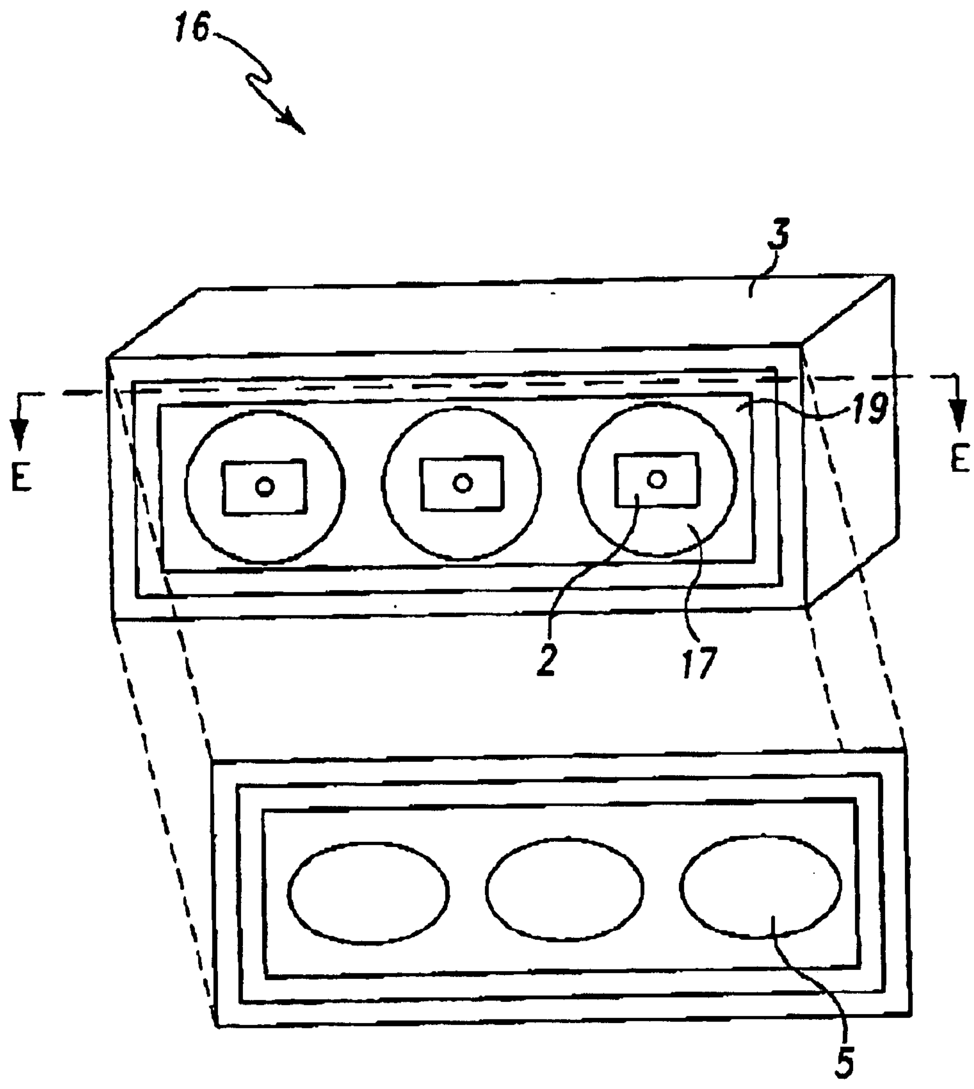
FIG. 9 shows an exploded front perspective view of the exemplary embodiment of FIG. 8.

FIG. 8 shows a front view of another exemplary embodiment of the subject invention. As shown in FIG. 8, this exemplary embodiment comprises AFS LED lamp assembly 16 that comprises plurality of condensing lenses 5 and lamp housing 3. FIG. 9 shows an exploded front perspective view of AFS LED lamp assembly 16. As shown in FIG. 9, AFS LED lamp assembly 16 further comprises plurality of LEDs 2 and a sheet 19 of a plurality of spherical surfaces 17. While FIG. 9 shows this exemplary embodiment with three LEDs, three condensing lenses and three spherical surfaces, it will be appreciated by one skilled in the art that any number of LEDs, condensing lenses and spherical surfaces can be used in the subject invention.

Figure 10:
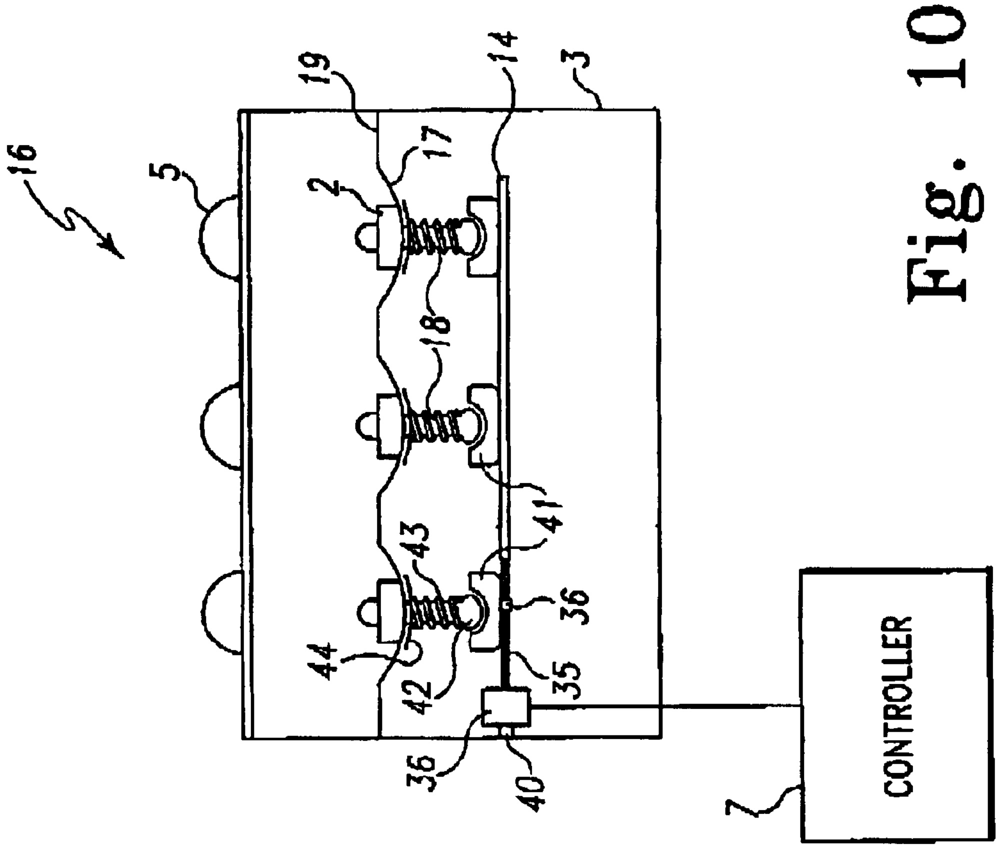
FIG. 10 shows a cross-sectional view of the exemplary embodiment of FIG. 8 along line E—E.

FIG. 10 shows a cross-sectional view of AFS LED lamp assembly 16 along line E—E of FIG. 8. As shown in FIGS. 9 and 10, LEDs 2 are each located on one of the plurality of spherical surfaces 17 in lamp housing 3. Sheet 19 of plurality of spherical surfaces 17 and each of the plurality of LEDs 2 are placed into lamp housing 3 so that each of the LEDs is aligned with one of the plurality of condensing lenses 5 to create the desired light beam pattern.

Referring to FIG. 10, each of the LEDs are mounted to spherical surface 17 by a stud 18 and a spring 43 located on and around the stud. One end of each of studs 18 passes through a hole (not pictured) in spherical surface 17 and is mounted to the back of each of LEDs 2 by means well known in the art. A cover plate 44 is positioned on each of studs 18 so that the cover plate covers the hole in spherical surface 17 that each stud passes through. The other end of each of studs 18 forms a ball 42 that can snap into a ball socket 41 so that the ball socket holds the ball of the stud. Each ball socket 41 is connected to connecting strip 14 by means well known in the art. In this embodiment, connecting strip 14 is located on the back of ball sockets 41. Threaded block 36 is mounted to connecting strip 14 and contains lead screw 35. Lead screw 35 is mechanically connected to stepper motor 6 so that the stepper motor can turn the lead crew and cause the connecting screw to move the connecting strip from side to side.

Referring to FIG. 10, as stepper motor 6 turns lead screw 35, connecting strip 14 will move ball sockets 41 from side to side. This movement will cause studs 18 to move each of LEDs 2 along each of spherical surfaces 17. Stepper motor 6 is pivotally mounted to lamp housing 3 by pivot point 40 so that it can pivot as connecting strip 14 moves. Spherical surface 17 allows LEDs 2 to slide across the surface in the desired direction. Stepper motor 6 is operably connected to controller 7. Controller 7 communicates to stepper motor 6 the direction the light beam is desired to move and the stepper motor causes the LEDs to move in that direction. In this manner, AFS LED lamp assembly 16 moves LEDs 2 in a desired direction in order to adjust the corresponding light beam without moving the condensing lenses or lamp assembly, which all remain stationary. It will be appreciated by one skilled in the art that sheet 19 of spherical surfaces 17 can comprise any number of materials known to those skilled in the art, including but not limited to self-lubricating plastic or self-lubricating steel. It will also be appreciated by one skilled in the art that each stud 18 can be connected to its own actuator so that each LED can be moved independently of each other. Moreover, it will be appreciated by one skilled in the art that the hole that stud 18 passes through can be any shape and will largely depend on which way the designer wishes to move the LEDs to cause the desired adjustment of the light beam.

Figure 11:
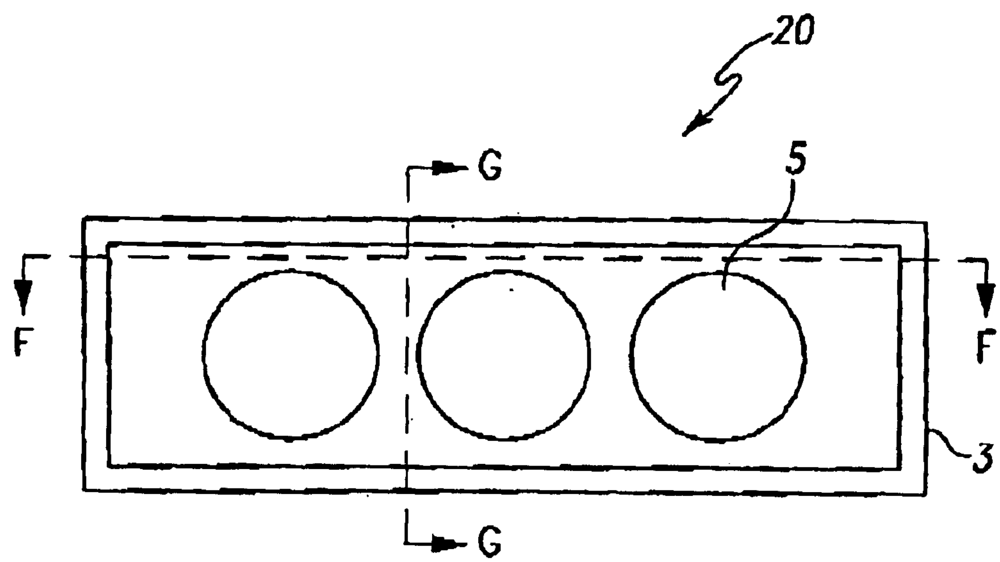
FIG. 11 shows a front view of another exemplary embodiment of the subject invention.
Figure 12:
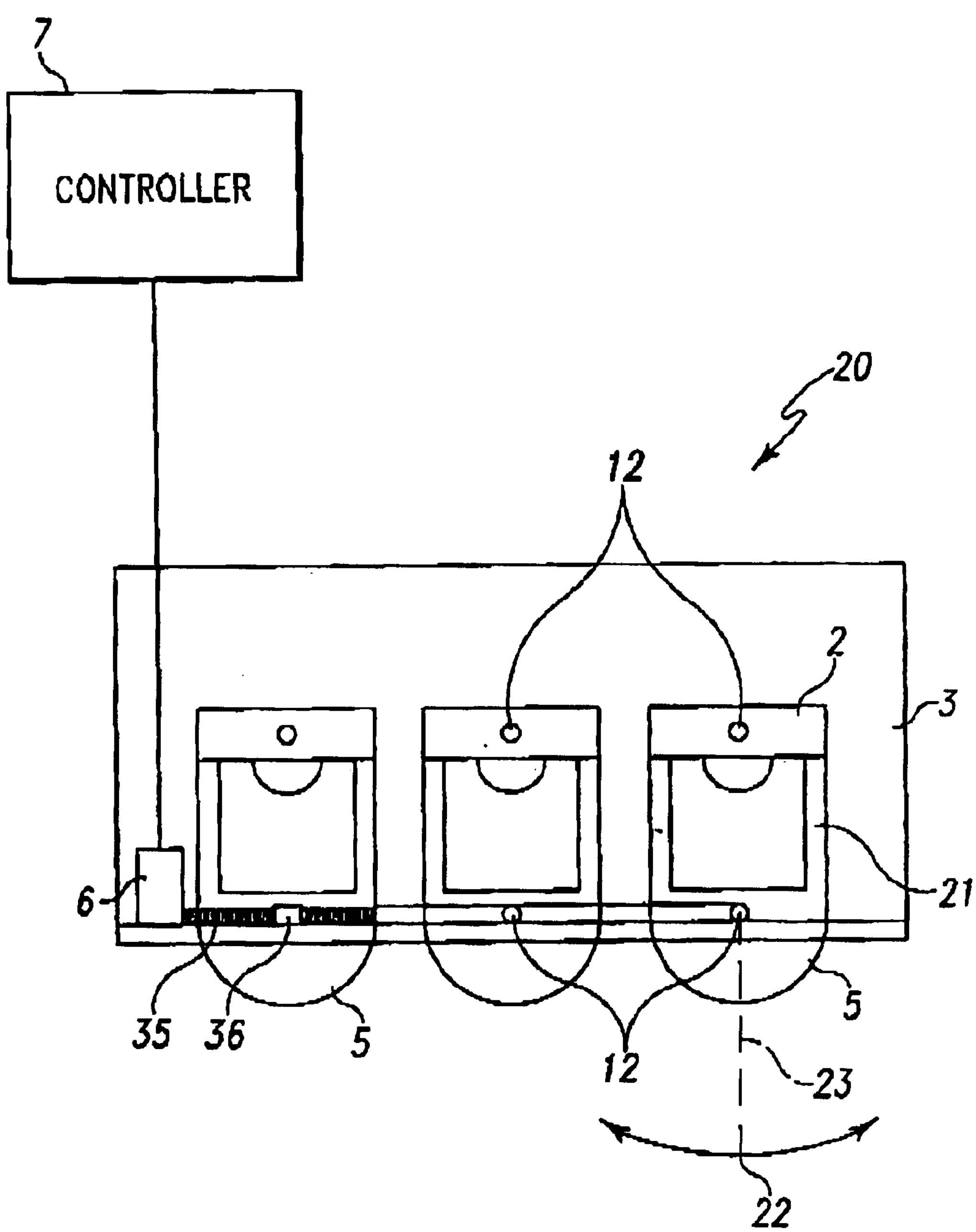
FIG. 12 shows a cross-sectional view of the exemplary embodiment of FIG. 11 along line F—F.

FIG. 11 shows a front view of another exemplary embodiment of the subject invention. As shown in FIG. 11, this exemplary embodiment comprises AFS LED lamp assembly 20 having plurality of condensing lenses 5 and lamp housing 3. FIG. 12 shows a cross-sectional view of AFS LED lamp assembly 20 along line F—F of FIG. 11. As shown in FIG. 12, AFS LED lamp assembly 20 further comprises plurality of LEDs 2 each connected to one of the plurality of condensing lenses 5 by one of a plurality of harnesses 21. In this manner, each of the plurality of LEDs 2 is positioned behind each of the plurality of condensing lenses 5 to form the desired light beam. Harnesses 21 are connected to LEDs 2 and condensing lens 5 by means well known in the art. While FIG. 12 shows AFS LED lamp assembly 20 utilizing three LEDs, three harnesses and three condensing lenses, it will be appreciated by one skilled in the art that the subject invention can utilize any number of LEDs, harnesses and condensing lenses.

Figure 13:
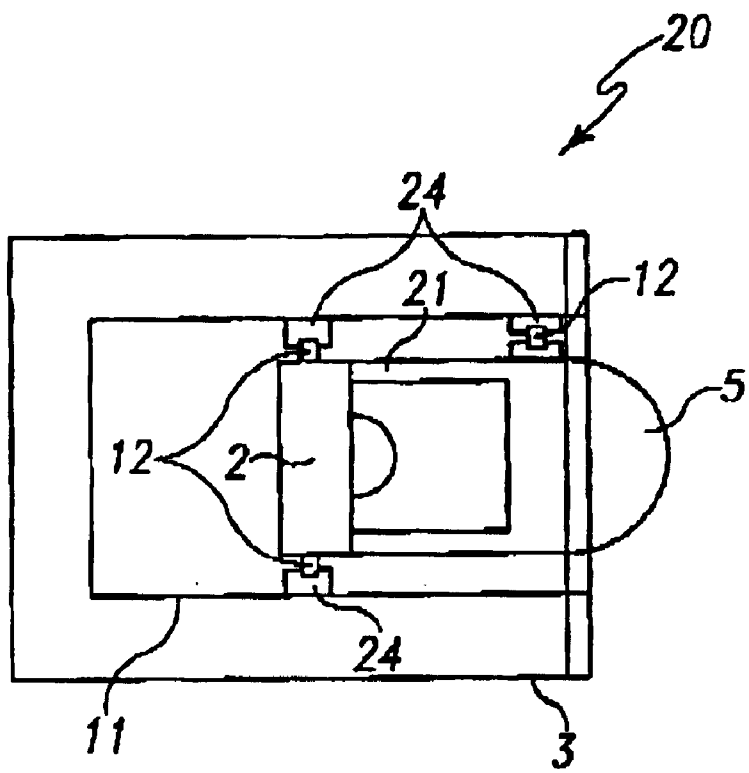
FIG. 13 shows a cross-sectional view of the exemplary embodiment of FIG. 11 along line G—G.

As shown in FIG. 12, plurality of harnesses 21 are connected to one another by connecting strip 14. Connecting strip 14 is pivotally connected to each of the plurality of harnesses 21 by plurality of axles 12. FIG. 13 shows a cross-sectional view of AFS LED lamp assembly 20 along line G—G of FIG. 11. As shown in FIG. 13, plurality of LEDs 2, harnesses 21 and condensing lenses 5 are pivotally connected to secondary housing 11 within lamp housing 3. Secondary housing 11 has plurality of pivot points 24 that each accept and hold the plurality of axles 12 that are located on harnesses 21 and LEDs 2. Referring back to FIG. 12, these pivoting mechanisms allow plurality of LEDs 2, plurality of harnesses 21 and plurality of condensing lenses 5 to pivot around lens plane 23 in a horizontal arc as depicted by directional arrows 22. Further, as plurality of LEDs 2, plurality of harnesses 21 and plurality of condensing lenses 5 to pivot around lens plane 23, the harnesses will pivot about axles 12 that pivotally connect the harnesses to connecting strip 14. While FIG. 12 shows connecting strip 14 connected on the top of each of the harnesses near the plurality of condensing lenses, it will be appreciated by one skilled in the art that the connecting strip can be connected to the harnesses in various locations or, alternatively, connected to the LEDs in various locations.

Referring back to FIG. 12, stepper motor 6 is mechanically connected to connecting strip 14 by lead screw 35 and threaded block 36 so that the stepper motor turns lead screw 35 in order to move the connecting strip in a manner to cause LEDs 2, harnesses 21 and condensing lenses 5 to pivot about lens plane 23. Stepper motor 6 is operably connected to controller 7. Controller 7 communicates to stepper motor 6 the direction the light beam is required to move. Stepper motor 6 then causes plurality of LEDs 2, plurality of harnesses 21 and plurality of condensing lenses 5 to swing back and forth as illustrated by directional arrows 22. By moving both the LEDs and the condensing lenses, AFS LED lamp assembly 20 allows for the light beam to be moved in the desired direction.

Figure 14:
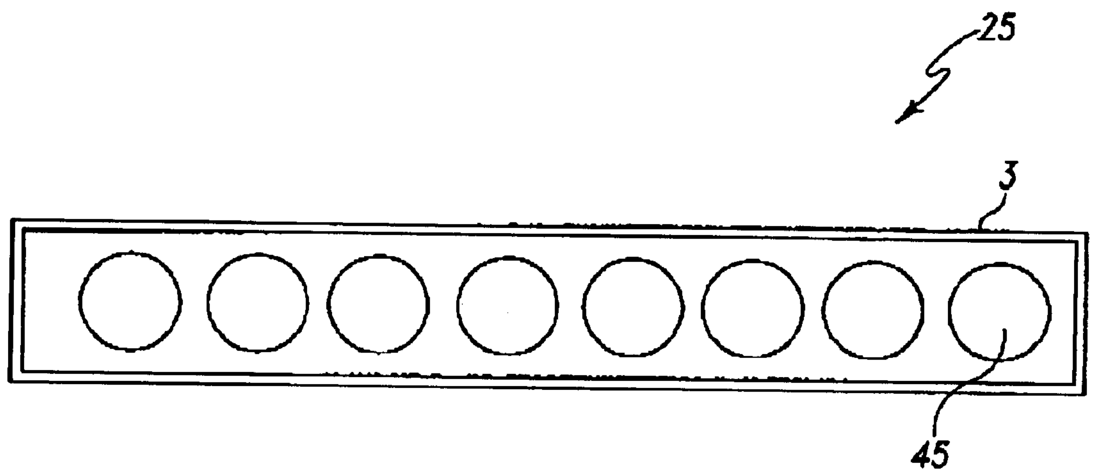
FIG. 14 is a front view of another embodiment of the subject invention.

FIG. 14 is a front view of another embodiment of the subject invention. As shown in FIG. 14, this embodiment of the subject comprises AFS LED lamp assembly 25 having a lens 45 and lamp housing 3. In this embodiment, lens 45 comprises a plastic lens used to meet the aesthetic preferences of the designer. It will be appreciated by one skilled in the art that the lens can comprise any type of lens, including but not limited to a glass lens. Moreover, it will be appreciated by one skilled in the art that any number of lenses can be used in this embodiment of the subject invention.

Figure 15:
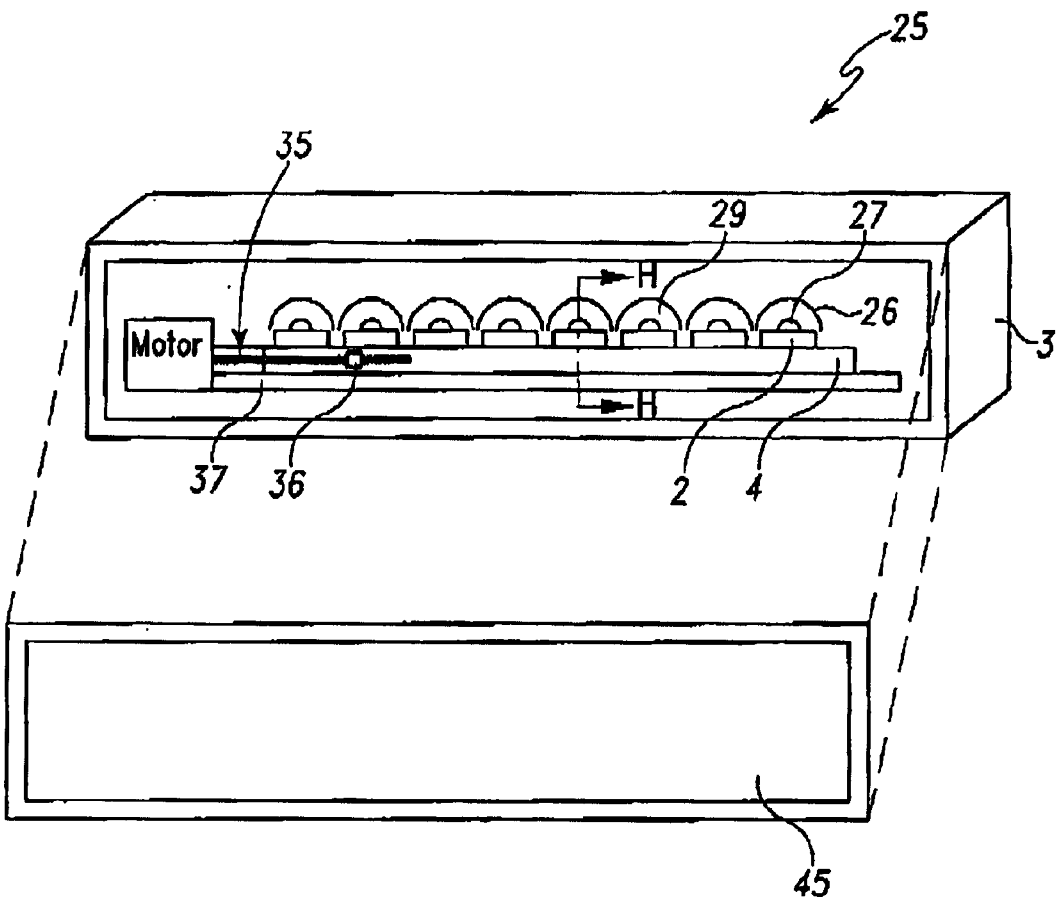
FIG. 15 shows an exploded front view of the exemplary embodiment of FIG. 14.
Figure 16:
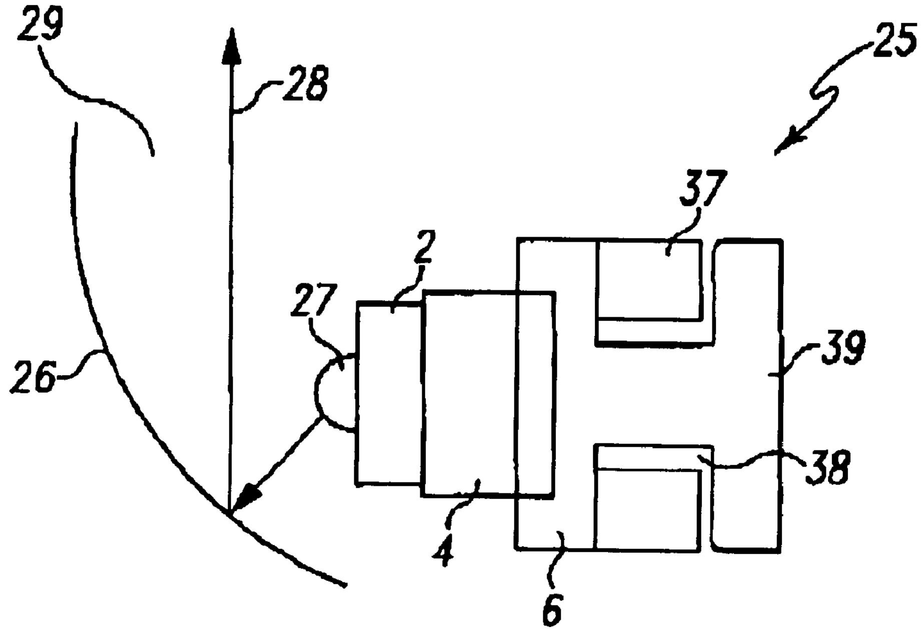
FIG. 16 shows a cross-sectional view of the exemplary embodiment of FIG. 14 along line H—H of FIG. 15.

FIG. 15 shows an exploded front view of AFS LED lamp assembly 25. As shown in FIG. 15, AFS LED lamp assembly 25 further comprises plurality of LEDs 2 and a plurality of reflectors 26. FIG. 16 shows a cross-sectional view of one of the plurality of LEDs 2 and one of the plurality of reflectors 26 along line H—H of FIG. 15. As shown in FIG. 16, each of the LEDs 2 is positioned in lamp housing 3 so that its light emitting end 27 emits light into the reflector 26. Light emitting end 27 emits a light ray 28 into reflector 26. Light ray 28 reflects off of reflector 26 so that it exits through an opening 29 and then passes through the lens 45 (shown in FIG. 15). While FIGS. 15 and 16 show one LED positioned to emit light into one reflector, it will be appreciated by one skilled in the art that any number of LEDs can be positioned to emit light into each reflector. It will be appreciated by one skilled in the art that all of reflectors 26 can be the same or different shape. Moreover, it will be appreciated by one skilled in the art that the reflectors will be a complex shape that is largely dependent upon the desired light beam pattern. Reflectors 26 are manufactured utilizing materials and processes well known in the art.

Referring back to FIGS. 15 and 16, LED carrier 4 is mechanically connected to stepper motor 6 by threaded block 36 and lead screw 35 so that it can move the LED carrier along track 37. As already described, T-block 39 allows LED carrier 4 to slide across track 37. Stepper motor 6 is operably connected to controller 7. As previously described, controller 7 causes stepper motor 6 to move LED carrier 4 and plurality of LEDs 2 in a desired direction to adjust the light beam in the desired manner. The movement of the light beam is accomplished by moving LEDs 2 without moving lens 45, reflectors 26 or AFS LED lamp assembly 25.

Figure 17:
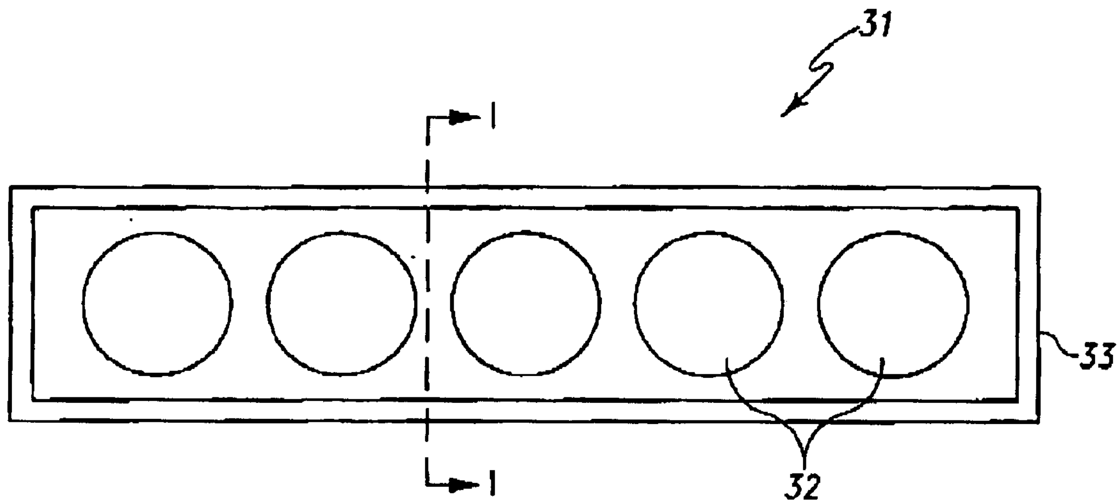
FIG. 17 shows a front view of another exemplary embodiment of the subject invention.

It will be appreciated by one skilled in the art that any of the above-described embodiments can be incorporated into a variety of different lamp housing structures. For example, FIG. 17 shows a front view of another exemplary embodiment of the subject invention utilizing a different lamp housing than described above. As shown in FIG. 17, the exemplary embodiment comprises AFS LED lamp assembly 31 having a plurality of external lenses 32 and lamp housing 33. The external lenses are used to meet the aesthetic preferences of automobile designers. Lamp housing 33 and external lenses 32 can be created by an injection molding process and can be joined to one another by utilizing an adhesive. It will be appreciated by one skilled in the art that many other methods can be utilized to connect the external lens to the lamp housing and to create the external lens and the lamp housing.

Figure 18:
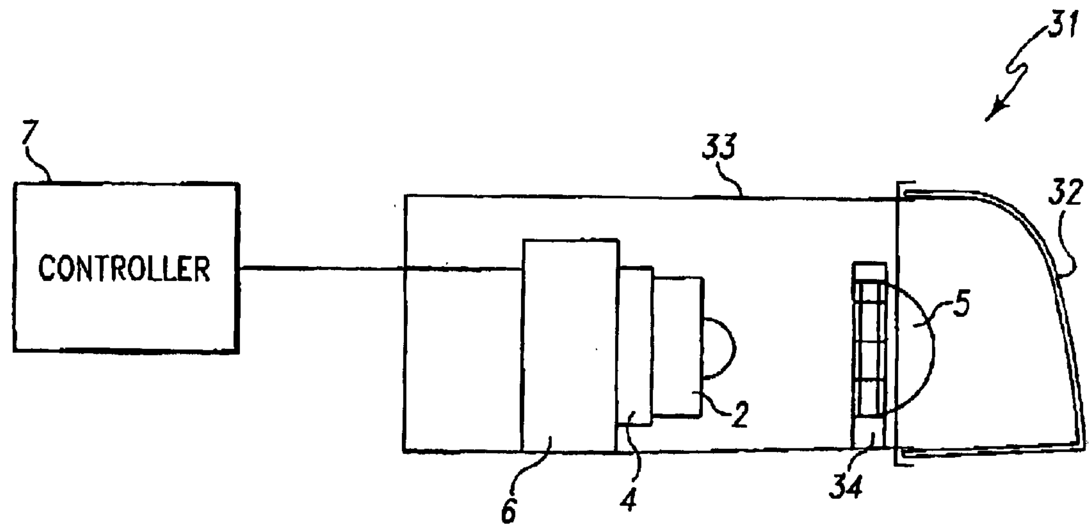
FIG. 18 shows a cross-sectional view of the exemplary embodiment of FIG. 17 along line I—I.

FIG. 18 shows a cross-sectional side view of AFS LED lamp assembly 31 along line I—I of FIG. 17. As shown in FIG. 18, AFS LED assembly 31 further comprises plurality of condensing lenses 5 mounted to a lens holder 34 within lamp housing 33. As in the previous embodiments, condensing lenses 5 can be mounted by snapping the lenses to the lens holder or using an adhesive to attach the lens to the lens holder. Plurality of LEDs 2 are mounted to LED carrier 4. Plurality of LEDs 2 and LED carrier 4 along with condensing lenses 5 and lens holder 34 are positioned in lamp housing 33 so that each of the plurality of LEDs are aligned with one of the plurality of condensing lenses to create the designed light beam. As described above in connection with FIGS. 1–3, stepper motor 6 is mechanically connected to LED carrier 4 in order to adjust the light beam in a desired manner. Further, as described above, controller 7 is operably connected to stepper motor 6 and causes the stepper motor to move LED carrier 4 and plurality of LEDs 2 in the desired direction to adjust the light beam. The movement of the light beam pattern is accomplished by moving LEDs 2 without moving AFS LED lamp assembly 31, condensing lenses 5 or external lenses 32, which are all stationary.

While the subject invention has been described in considerable detail with references to particular embodiments thereof, such is offered by way of non-limiting examples of the invention as many other versions are possible. It is anticipated that a variety of other modifications and changes will be apparent to those having ordinary skill in the art and that such modifications and changes are intended to be encompassed within the spirit and scope of the pending claims.

I claim:

1. An adjustable front lighting system for an automobile comprising:

a. at least one stationary automotive lamp assembly having at least one stationary lens connected to a stationary lamp housing;

b. at least one moveable LED with a light emitting end, the LED positioned in the lamp housing in alignment with the lens so that light emitted from the LED's light emitting end passes through the lens and creates a light beam for the automobile;

c. at least one actuator mechanically connected to the at least one LED in a manner that allows the actuator to move the LED; and d. at least one controller operably connected to the at least one actuator in a maimer that causes the actuator to move the LED and the light beam in a horizontal plane, so that the light beam points in a direction that corresponds to whatever direction the automobile is traveling in.

2. The lighting system of claim 1 further comprising:

a. at least one carrier located within the lamp housing, the carrier having a first side upon which the at least one LED is mounted and a second side that forms a T-block; and b. at least one track that accepts and holds the T-block of the at least one carrier so that the at least one carrier can slide along the track.

3. The lighting system of claim 2 wherein the actuator comprises a lead screw, the lead screw having a first end mechanically connected to a motor and a second end connected to the at least one carrier so that the motor can extend or withdraw the lead screw causing the LED carrier and the attached LED to slide along the at least one track.

4. The lighting system of claim 2 wherein the carrier is constructed from a heat sinking material that allows the carrier to serve as the LED's heat sink.

5. The lighting system of claim 2, further comprising at least one stationary reflector, the reflector aligned in the lamp housing with the lens and the LED, wherein the light emitting end of the LED faces and emits light into the reflector so that the light emitted into the reflector will reflect off of the reflector and pass through the lens.

6. The lighting system of claim 1 further comprising at least one arm, the arm having a first end anchored to the at least one LED and a second end pivotally connected to the at last one lens, so that the at least one LED can pivot in a horizontal arc.

7. The lighting system of claim 6 wherein the at least one LED comprises two LEDs connected to one another by a strip that connects the two LEDs to the actuator, the ship being pivotally connected to each LED.

8. The lighting system of claim 1 further comprising a. at least one spherical surface located within the lamp housing, the spherical surface having a hole that allows a stud to pass through the spherical surface, the stud having a first end attached to the LED and a second end that forms a ball;

b. a ball socket positioned within the lamp housing that holds and contains the ball, the ball socket being mechanically connected to the actuator so that the actuator can cause the ball socket to move in a horizontal plane which in turn moves the stud and causes the attached LED to slide along the spherical surface in order to adjust the light beam in a horizontal plane; and c. a spring located on and around the stud.

9. The lighting system of claim 8 wherein the spherical surface comprises a self-lubricating material.

10. The lighting system of claim 1 wherein the at least one stationary lens comprises a condensing lens.

11. The lighting system of claim 10 further comprising at least one external stationary lens positioned in front of the at least one condensing lens.

12. The lighting system of claim 1 wherein the controller comprises a microprocessor that receives input from a plurality of sensors.

13. A method of providing forward lighting for a vehicle comprising the steps of:

a. providing an adaptive front lighting system lamp assembly having (i) at least one LED with a light emitting end, the LED being mechanically connected to at least one actuator, and (ii) at least one stationary lens aligned with the at least one LED in a location that creates a light beam for the vehicle;

b. generating the light beam for the vehicle with the lamp assembly so that the light beam points in a first direction which coincides with the direction that the vehicle is traveling;

c. causing the vehicle to travel in a second direction; and d. moving the light beam so that the light beam points in the second direction that the vehicle is traveling by utilizing the at least one actuator to move the at least one LED without moving the at least one stationary lens or the lamp assembly.

14. The method of providing forward lighting of claim 13 wherein the at least one actuator moves the at least one LED horizontally from side to side to adjust the light beam in a horizontal direction.

15. The method of providing forward lighting of claim 13 wherein the at least one actuator moves the at least one LED so that it pivots in a horizontal plane to adjust the light beam in a horizontal direction.

16. The method of providing forward lighting of claim 13 further comprising the step of moving the at least one LED up and down to adjust the light beam in a vertical direction.

17. The method of providing forward lighting of claim 13 wherein the lamp assembly further comprises at least one reflector positioned in the lamp assembly so that the at least one LED's light emitting end faces the reflector and emits light into the reflector and the reflector reflects the emitted light through the at least one stationary lens.

18. The method of providing forward lighting of claim 17 wherein the at least one actuator moves the at least one LED from side to side to adjust the light beam in a horizontal direction.

19. The method of providing forward lighting of claim 17 further comprising the step of moving the at least one LED forwards and backwards to adjust the light beam in the vertical direction.

* * * * *